United States Patent
Mies

(10) Patent No.: US 10,753,730 B2
(45) Date of Patent: Aug. 25, 2020

(54) METHOD FOR ANALYZING SURFACE WAVINESS

(71) Applicant: Klingelnberg GmbH, Hückeswagen (DE)

(72) Inventor: Georg Mies, Wipperfürth (DE)

(73) Assignee: Klingelnberg GmbH (DE)

( * ) Notice: Subject to any disclaimer, the term of this patent is extended or adjusted under 35 U.S.C. 154(b) by 0 days.

(21) Appl. No.: 16/423,905

(22) Filed: May 28, 2019

(65) Prior Publication Data

US 2019/0368863 A1   Dec. 5, 2019

(30) Foreign Application Priority Data

May 29, 2018   (DE) .................. 10 2018 112 805

(51) Int. Cl.
*G01B 11/24* (2006.01)
*G01B 5/20* (2006.01)

(52) U.S. Cl.
CPC .......... *G01B 11/2416* (2013.01); *G01B 5/202* (2013.01)

(58) Field of Classification Search
CPC . G01B 5/204; G01B 5/28; G01B 5/20; G01B 5/008; G01B 5/166; G01B 7/34; G01B 7/146; G01B 7/148; G01B 11/24; G01B 11/2416; G01B 21/20; G01M 13/021
USPC ..... 356/600, 601–623, 237.1–237.5; 73/162, 73/104, 105; 33/503, 551, 556, 559, 33/501.14, 501.7, 501.11, 501.12
See application file for complete search history.

(56) References Cited

U.S. PATENT DOCUMENTS

| | | | | |
|---|---|---|---|---|
| 4,048,849 A | * | 9/1977 | Gocho | B21B 38/00 73/105 |
| 4,285,133 A | * | 8/1981 | Sterki | G01B 21/20 33/1 M |
| 4,547,674 A | * | 10/1985 | Pryor | G01S 17/48 250/559.23 |
| 4,697,168 A | * | 9/1987 | Baker | G01L 3/109 341/15 |
| 4,841,644 A | * | 6/1989 | Bertz | G01B 7/146 33/501.8 |
| 5,461,797 A | * | 10/1995 | Royer | G01B 5/202 33/501.14 |
| 6,220,158 B1 | * | 4/2001 | Hartmann | B41F 33/14 101/248 |

(Continued)

*Primary Examiner* — Hoa Q Pham
(74) *Attorney, Agent, or Firm* — McCarter & English, LLP

(57) ABSTRACT

Method for analyzing surface waviness of tooth flanks of a gearwheel, comprising measuring two or more teeth of the gearwheel, wherein a deviation of their tooth flank geometry from the setpoint geometry is measured along at least one measuring path on each of the teeth; measuring at least one further tooth, wherein a deviation of its tooth flank geometry from the setpoint geometry is measured along at least one partial measuring path whose length is less than the length of the measuring path; and/or measuring at least one further tooth, wherein a deviation of the tooth flank geometry from the setpoint geometry is measured by touching at least one point on the tooth flank; associating a rotational angle with each measured value and determining a geometrically captured order spectrum by order analysis of the deviations plotted over the rotational angle, wherein one or more compensation and/or interpolation functions are determined.

11 Claims, 2 Drawing Sheets

(56) References Cited

U.S. PATENT DOCUMENTS

| | | | | |
|---|---|---|---|---|
| 7,117,609 B2* | 10/2006 | Mies | ............ | B23F 23/06 |
| | | | | 33/501.9 |
| 7,755,771 B2* | 7/2010 | Komori | ............ | G01B 11/2416 |
| | | | | 356/601 |
| 7,784,333 B2* | 8/2010 | Nemoto | ............ | G01B 3/008 |
| | | | | 33/503 |
| 8,411,283 B2* | 4/2013 | Maschirow | ............ | G01M 13/021 |
| | | | | 356/601 |
| 8,463,575 B2* | 6/2013 | Kikuchi | ............ | B23F 5/04 |
| | | | | 702/150 |
| 8,991,246 B2* | 3/2015 | Hirono | ............ | G01B 5/008 |
| | | | | 33/503 |
| 9,752,860 B2* | 9/2017 | Marsh | ............ | G01B 5/202 |
| 2007/0103147 A1* | 5/2007 | Kondo | ............ | B62D 15/0215 |
| | | | | 324/207.25 |
| 2018/0128596 A1* | 5/2018 | Mies | ............ | G01B 11/005 |
| 2019/0049233 A1* | 2/2019 | Mies | ............ | G01B 11/26 |

\* cited by examiner

METHOD FOR ANALYZING SURFACE WAVINESS

CROSS-REFERENCE TO RELATED APPLICATIONS

This application claims the benefit under 35 U.S.C. § 119(e) to German patent application no. DE 10 2018 112 805.3 filed May 29, 2018, which is hereby expressly incorporated by reference as part of the present disclosure.

FIELD OF THE INVENTION

The present disclosure generally relates to a method for analyzing surface waviness of the tooth flanks of a gearwheel.

BACKGROUND

The noises of vehicle transmissions are no longer completely masked by the engine noise in motor vehicles having hybrid drive or fully-electric drive. Transmission noises which arise due to the rolling of the gearwheel pairs of a transmission can therefore be perceived by the vehicle occupants and found to be annoying. The study of the noise behavior of gear teeth has developed in the course of the trend toward hybrid drives or fully-electric drives in recent years from a marginal discipline of university research to an important quality feature in the industrial production of transmissions.

It has been shown that solely a manufacturing reduction of the deviations of gear teeth from their setpoint geometry, as are determined in conventional isolated defect testing, does not necessarily also result in better noise behavior of the gear teeth in the noise testing and/or rolling testing. Gear teeth susceptible to noise can thus be manufactured more precisely upon observation of the individual defect testing than gear teeth which are not susceptible to noise. The demand therefore exists for the production of gear teeth of maintaining the specified manufacturing tolerances, on the one hand, and additionally meeting the specifications for the noise behavior, on the other hand.

The noises of gear teeth arise due to the tooth contact, i.e., the rolling of the tooth flanks. To analyze dominant frequencies of gear teeth susceptible to noise, a noise measured during the rolling of gear teeth is converted into an order spectrum, for example, with the aid of Fourier transform.

In addition to the orders of tooth engagement, such an order spectrum also has so-called "phantom orders", which cannot be influenced by the design of the gear teeth and result from manufacturing faults. Dominant phantom orders can arise, for example, due to chucking faults, tool faults, defective bearings, or the axial feed inside a machine tool. It is apparent, for example, that wobbling of a tool during the production of the gear teeth reproduces a periodically repeating deviation from the setpoint geometry on the tooth flanks. This deviation can be geometrically captured using precise coordinate measuring devices.

In many cases, a relationship can be established between the waviness which can be geometrically captured on the surfaces of the tooth flanks and the acoustically detectable, dominant phantom orders. Therefore, a potentially critical noise behavior of gear teeth and/or the state of a machine tool can be concluded with the aid of the geometrical capture of surface waviness of gear teeth.

SUMMARY

The complete measurement of gear teeth with respect to the surface waviness of the tooth flanks is time-consuming and cannot be implemented in industrial mass production, however. It is therefore an objective to specify a method for analyzing surface waviness of the tooth flanks of a gearwheel which enables a reliable analysis of surface waviness with short cycle time.

At least some embodiments relate to a method for analyzing surface waviness of the tooth flanks of a gearwheel, comprising the following method steps:

A) measuring two or more teeth of a gearwheel, wherein a deviation of the tooth flank geometry from the setpoint geometry is measured along at least one measuring path on each of the two or more teeth;

B) measuring at least one further tooth of the gearwheel, wherein a deviation of the tooth flank geometry from the setpoint geometry is measured along at least one partial measuring path for the further tooth, wherein the length of the partial measuring path is less than the length of the measuring path; and/or measuring at least one further tooth of the gearwheel, wherein a deviation of the tooth flank geometry from the setpoint geometry is measured by touching at least one point on the tooth flank of the further tooth for the further tooth;

C) associating a rotational angle with each measured value and determining a geometrically captured order spectrum by an order analysis of the deviations plotted over the rotational angle, wherein one or more compensation and/or interpolation functions are determined.

Because some teeth of the gearwheel are only partially measured in method step B), the cycle time for a measuring procedure can be shortened. In this case, the deviations and/or measurement points formed along the partial measuring path in method step B) form support points for determining the one or more compensation and/or interpolation functions.

The measuring path and/or the partial measuring path can be extended at least in portions along a profile direction and/or along the flank direction. Alternatively, the measuring path and/or the partial measuring path can be oriented transversely to a profile direction and/or flank direction.

It can be provided that in method step A), at least four teeth are measured. Thus, for example, four teeth can be measured, which are spaced apart from one another at essentially equidistant angle intervals, for example.

Alternatively or additionally, it can be provided that in method step B), at least eight further teeth are measured. If, for example, four teeth are measured in method step A), two further teeth can be measured between each two of the four teeth in method step B) to improve the quality of the one or more compensation and/or interpolation functions to be determined. It is apparent that the number of the teeth to be measured in method steps A) and B) can be adapted specifically to the gear teeth.

It can be provided that the teeth measured in method step A) are not arranged adjacent to one another. More detailed measurements can thus take place in each case distributed around the circumference, the measured values of which are supplemented by the values according to method step B).

Alternatively, it can be provided that the teeth measured in method step A) are arranged adjacent to one another. A rapid measurement of successive teeth can thus take place, the measured values of which are supplemented by the values according to method step B).

It can be provided that in method step B), at least one tooth is measured, which is different from the two or more teeth from method step A), to generate support points for the one or more compensation and/or interpolation functions to be determined.

According to at least some embodiments, it is provided that in method step A) and in method step B), an optical measurement of the deviations is performed by means of an optical sensor system. The optical measurement enables a further reduction of the cycle time for a measuring procedure in relation to a tactile measurement.

Alternatively, it can be provided that in method step A), a tactile measurement of the deviation is performed by means of a measuring feeler and in method step B), an optical measurement of the deviation is performed by means of an optical sensor system. Accordingly, the tactile measurement can be used in a known manner for capturing the measured values for the individual defect testing, while the partial measuring paths to be measured in method step B), which are used as support points for determining the one or more compensation and/or interpolation functions, can be optically captured using shortened measuring time.

It can be provided that method step A) is executed before method step B) with respect to time. Alternatively, it can be provided that method step B) is carried out before method step A) with respect to time. Alternatively, it can be provided that, if an optical measuring system and a tactile measuring system are used, method step A) and method step B) take place at least partially or completely simultaneously.

At least some embodiments may be distinguished in that the optical sensor system is a confocal sensor system for chromatic-confocal distance measurement. A robust, precise measurement of the deviations can thus take place, wherein the measurement accuracy of the optical system corresponds to the measurement accuracy of tactile coordinate measuring systems.

Alternatively, the optical sensor system can be a sensor system having triangulation sensor or interferometer.

According to at least some embodiments, it is provided that in method step B), during the optical measurement, a continuous rotation of the gearwheel takes place in relation to an optical sensor of the optical sensor system, wherein the continuous rotation is carried out at constant angular velocity over the entire angle range of the teeth to be measured. A short cycle time for the optical measurement can be achieved in this manner.

In at least some embodiments, it can be provided that in method step B), all of the teeth of the gearwheel are measured which were not measured in method step A). The accuracy of the one or more compensation and/or interpolation functions to be determined can thus be improved.

It can be provided that in method step B), all teeth of the gearwheel are measured. In this case, in method step B), all of the teeth of the gearwheel are measured which were not measured in method step A), and in addition the teeth are also measured which were measured in method step A). The accuracy of the one or more compensation and/or interpolation functions to be determined can thus be improved.

If a tactile measurement along at least one measuring path takes place in method step A) and an optical measurement along at least one partial measuring path takes place in method step B), the measurement of all teeth in method step B) only means a slight increase of the cycle time, for example, for the case in which the measurement in method step B) is carried out during continuous rotation at constant angular velocity over the entire angle range of the teeth to be measured.

According to at least some embodiments, it is provided that in method step B), for at least one tooth flank to be measured, a first measurement of the flank and at least one further measurement of the same flank take place, wherein a distance of a rotational axis of the gearwheel in relation to an optical sensor of the optical sensor system after the first measurement and before the second measurement is reduced or increased.

For example, the optical sensor can be positioned for a first measurement of a tooth flank at a distance a1 in relation to a rotational axis of the gearwheel to detect a first measurement point. Subsequently, the optical sensor can be positioned for a second measurement of the tooth flank at a distance a2, which is different from the distance a1, in relation to the rotational axis of the gearwheel, to detect at least one second measurement point. It can be provided that a plurality of measurement points are captured continuously or step-by-step along the partial measuring path of the tooth flank.

It can be provided that the optical sensor in method step B) is positioned at a distance a1 in relation to the rotational axis of the gearwheel, and subsequently a rotation of the gearwheel takes place, so that firstly all measured values for the tooth flanks to be measured in method step B) are captured at the distance a1. The distance between the rotational axis and the optical sensor can then be changed to the distance a2, which is different from the distance a1. In the course of the following workpiece rotation, all measured values for the teeth to be measured in method step B) are captured for the distance a2. In this manner, a plurality of measured values for the partial measuring paths and/or measurement points to be captured in method step B) can be captured in a short time.

The measurements in method step B) can be carried out, alternatively to the continuous tool rotation, by approaching discrete measurement positions, which are used as the starting position for the optical or tactile scanning of the partial measuring path or a measurement point.

According to at least some embodiments, it is provided that method step A) and method step B) are carried out by a tactile measurement. The method can thus be carried out on existing coordinate measuring machines, which have solely tactile measuring units.

The order analysis in method step C) can be performed by a step-by-step determination of dominant frequencies, wherein the following method steps are carried out for a specified frequency range: determining compensation angle functions, wherein the compensation angle function having the greatest amplitude is defined as the first dominant frequency of the deviations plotted over the rotational angle; filtering the deviations plotted over the rotational angle of the first dominant frequency; determining compensation angle functions for the deviations, which are filtered of the first dominant frequency and plotted over the rotational angle, wherein the compensation angle function having the greatest amplitude is defined as the second dominant frequency of the deviations plotted over the rotational angle.

The interpolation and/or compensation functions can alternatively or additionally be described using further periodic functions instead of angle functions.

According to at least some embodiments, it is provided that in method step A), the deviation of the tooth flank geometry from the setpoint geometry is measured along a plurality of measuring paths in the profile direction and/or in the flank direction, for example, like a measurement grid, and/or in method step B), an indexing measurement and/or a partial profile measurement takes place.

Depending on the waviness profile to be expected, the measurement strategy can therefore be adapted specifically for the gear teeth. If it is to be expected, for example, that the spatial orientation of the waviness on the tooth flanks is relevant for an analysis of the order spectrum, it can be advantageous to detect two or more measuring paths or partial measuring paths in method step A) and/or B) for the tooth flanks to be measured.

It can be provided that alternatively or additionally to method step B), measurement data of an indexing measurement are used and analyzed in method step C). Accordingly, method step B) can be completely replaced in that measurement data of the relevant gearwheel which have been captured in an indexing measurement are used together with the measured values from method step A) for method step C). The measured values of a preceding indexing measurement can, according to at least some embodiments, be used in addition to values measured in a method step B).

Furthermore, it can be provided that alternatively or additionally to method step A), measurement data of a profile and/or flank line measurement are used and analyzed in method step C). Accordingly, method step A) can be completely replaced in that measurement data of the relevant gearwheel, which have been captured in a profile and/or flank line measurement, are used together with the measured values from method step B) for method step C). The measured values of a preceding profile and/or flank line measurement can be used according to at least some embodiments in addition to the values measured in a method step A).

If, alternatively to method step A), exclusively measured values of a profile and/or flank line measurement and, alternatively to method step B), exclusively measured values of an indexing measurement are used, method step C) can be carried out on the basis of measured values of a conventional individual fault testing.

To enable a plausibility check and a cause analysis, it is provided according to at least some embodiments that a noise measurement of the gearwheel is carried out on the noise test stand and a determination of an acoustically captured order spectrum is carried out and a comparison of the acoustically captured order spectrum to the geometrically captured order spectrum takes place. If acoustically captured, dominant noise orders of a gearwheel susceptible to noise are also detectable in the geometrically captured order spectrum of this gearwheel, the surface waviness of the tooth flanks can be the cause of the noise development.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhaustive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

Exemplary embodiments of the invention, which are understood not to be limiting, are described in greater detail hereafter with reference to the drawings.

DETAILED DESCRIPTION

Figure 1:
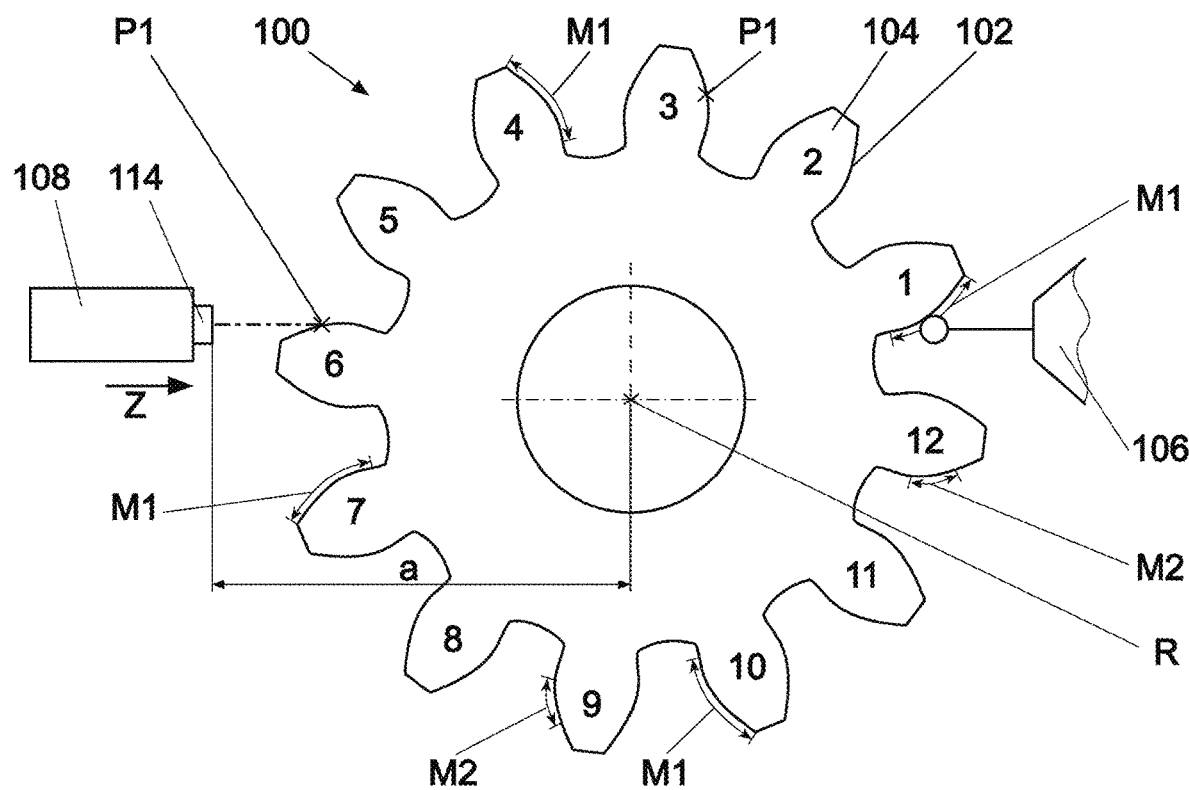
FIG. 1 schematically shows a gearwheel to be analyzed with respect to surface waviness.

FIG. 1 shows a gearwheel 100, the tooth flanks 102 of the teeth 104 of which are studied with the aid of a method according to at least some embodiments for analyzing surface waviness. For better comprehensibility of the following statements, the teeth 104 of the gearwheel 100 have been numbered continuously from 1-12.

In a method step A), firstly the teeth 1, 4, 7, 10, which are each not arranged adjacent to one another, are measured. In this case, the deviation of the respective tooth flank geometry from the setpoint geometry is measured along a measuring path M1 in the profile direction on each of the teeth 1, 4, 7, 10. Therefore, four teeth 1, 4, 7, 10 are measured in the present case in method step A).

The measuring of the respective tooth flanks 102 of the teeth 1, 4, 7, 10 in method step A) is performed in the present case in a tactile manner with the aid of a measuring feeler 106. The measuring feeler 106 is fastened to a coordinate measuring device (not shown here), wherein this can be, for example, a precision measuring center of the Klingelnberg Group.

According to at least some embodiments, it can be provided that the measurement of the tooth flanks 102 of the teeth 1, 4, 7, 10 along the respective measuring paths M1 takes place with the aid of an optical sensor system.

In a method step B), further teeth 3, 6, 9, 12 of the gearwheel 100 are measured, which are different from the teeth 1, 4, 7, 10. For the teeth 3, 6 to be measured in method step B), a deviation of the respective tooth flank geometry from the setpoint geometry of the gearwheel 100 is captured by touching a respective point P1 on the respective tooth flank 102 of the teeth 3, 6.

For the teeth 9, 12 to be measured in method step B), in each case a deviation of the respective tooth flank geometry from the setpoint geometry is measured along at least one partial measuring path M2 in the profile direction. The length of the partial measuring path M2 is less than the length of the measuring path M1.

According to at least some embodiments, it can be provided that in method step B), for all further teeth 3, 6, 9, 12 to be measured, in each case a partial measuring path M2 of the respective tooth flank geometry is captured. Alternatively, it can be provided that for each of the teeth 3, 6, 9, 12 to be measured in method step B), only a single point P1 of the respective tooth flank 102 is touched.

In method steps B), four further teeth are therefore measured in the present case. According to at least some embodiments, it can be provided that more than four further teeth are measured in method step B), for example, all of the teeth are measured in method step B) which were not measured in method step A), or all teeth of a gearwheel are measured in method step B), including the teeth which were measured in method step A).

The measurement in method step B) is an optical measurement of the deviation by means of an optical sensor system 108 in the present case. According to at least some alternative embodiments, it can be provided that both the measurement in method step A) and also the measurement in method step B) are performed by a tactile measurement. The optical sensor system 108 is in the present case a confocal sensor system 108 for chromatic-confocal distance measurement.

In the present example, it is provided that firstly the tactile measurement of the teeth 1, 4, 7, 10 is performed with the aid of the measuring feeler 106. After the measurement has been completed, the measuring feeler 106 is retracted, so that a collision does not occur during a subsequent rotation of the gearwheel 100. After the tactile measurement has been completed, the optical measurement of the teeth 3, 6, 9, 12 is performed.

It can be provided that during the optical measurement, a continuous rotation of the gearwheel 100 is performed in relation to the optical sensor 114 of the optical sensor system 108, wherein the continuous rotation is carried out around a rotational axis R at constant velocity over the entire angle range of the teeth to be measured.

It can be provided that the measurement of the partial measuring path M2 is achieved in that a distance a of the rotational axis R of the gearwheel 100 in relation to the optical sensor system 108 or the sensor 114, respectively, is decreased or increased step-by-step.

In a method step C), the analysis of the measured values is performed, wherein a rotational angle corresponding to the rolling of the gearwheel is associated with each measured value of the tooth flank. Subsequently, a determination of a geometrically captured order spectrum is performed by an order analysis of the deviations plotted over the rotational angle, wherein one or more compensation and/or interpolation functions are determined.

Figure 2A:
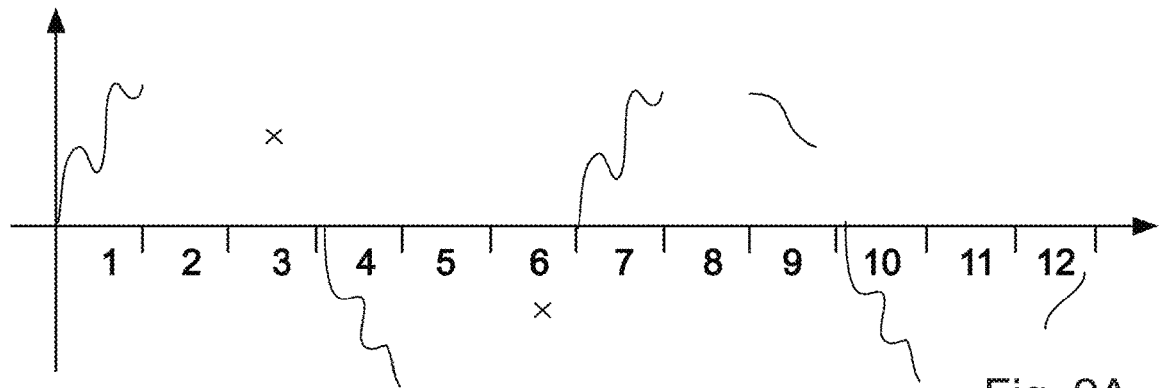
FIGS. 2A-2C schematically show an analysis of measured deviations.

In FIG. 2A, the measured deviations of the individual tooth flanks 1-12 from the setpoint geometry are arrayed according to the rotational angle during the rolling. Therefore, the deviations (ordinate) are plotted over the rotational angle (abscissa) in the way in which they contribute in succession to the noise excitation during the rolling in the tooth engagement.

Figure 2B:
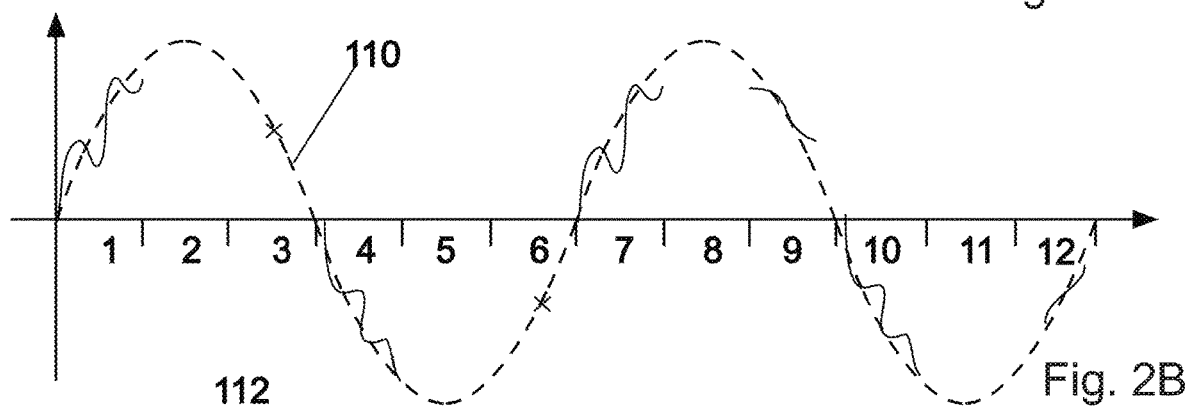

For the deviations plotted over the rotational angle shown in FIG. 2B, in the present case firstly the compensation angle function 110 having the greatest amplitude is determined. This compensation angle function 110 represents a first dominant frequency of the geometrical deviations plotted over the rotational angle. In the present case, the compensation angle function 110 is a sine function.

Figure 2C:
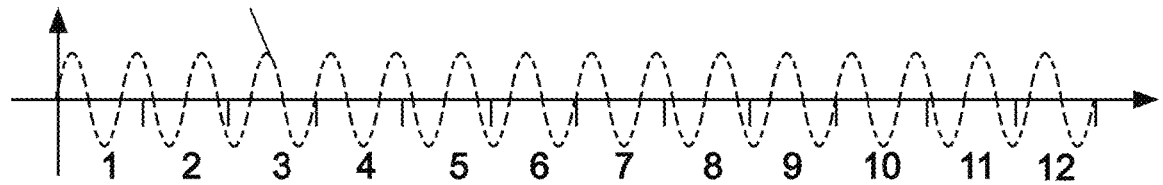

In a next step shown in FIG. 2C, the deviations are filtered of the compensation angle function 110. Subsequently, the filtered compensation angle function 112 having the greatest amplitude is in turn determined, which represents the second dominant frequency of the geometrically captured deviations.

In this manner, an order spectrum may be determined successively from the geometrically captured deviations to analyze the surface waviness. Because the tooth flanks in method step B) are only measured partially or at points, a rapid analysis of the surface waviness of the tooth flanks 102 of the gear teeth 100 can thus be performed.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method comprising:
analyzing surface waviness of tooth flanks of a gearwheel, including:
A) measuring a first deviation including measuring a deviation of tooth flank geometry of at least two teeth of the gearwheel from a setpoint geometry along at least one measuring path on each of the at least two teeth;
B) one or more of
measuring a second deviation including measuring a deviation of tooth flank geometry of at least one further tooth of the gearwheel from the setpoint geometry along at least one partial measuring path, wherein a length of the partial measuring path is less than a length of the measuring path; or
measuring a third deviation including measuring a deviation of the tooth flank geometry of the at least one further tooth from the setpoint geometry including touching at least one point on a tooth flank of the at least one further tooth; and
C) associating a rotational angle with each measured deviation and determining a geometrically captured order spectrum including an order analysis of the deviations measured in steps A and B plotted over the rotational angle, and in turn determining one or more of at least one compensation or at least one interpolation function.

2. The method according to claim 1, wherein one or more of said at least two teeth include at least four teeth;
said at least one further tooth includes at least eight further teeth;
said at least two teeth are not adjacent to one another; or
said at least one further tooth is different from the at least two teeth.

3. The method according to claim 1, wherein:
said measuring of the first, second and third deviations includes optical measurement thereof using an optical sensor system;
or
said measuring of the first deviation includes tactile measurement thereof using a measuring feeler, and said measuring of the second and third deviations includes optical measurement thereof using an optical sensor system.

4. The method according to claim 3, wherein the optical sensor system defines a confocal sensor system configured for chromatic-confocal distance measurement.

5. The method according to claim 3, wherein step B) includes continuously rotating the gearwheel relative to an optical sensor of the optical sensor system during said optical measurement at constant angular velocity over an entire angle range of teeth to be measured.

6. The method according to claim 3,
wherein said measuring a deviation in step B) includes measuring a deviation of at least one tooth flank of the at least one further tooth, which includes measuring a first measurement thereof and measuring at least one further measurement of the same at least one tooth flank; and
including decreasing or increasing a distance of a rotational axis of the gearwheel relative to an optical sensor of the optical sensor system after the measuring of the first measurement and before the measuring of the at least one further measurement.

7. The method according to claim 1, wherein said measuring a deviation includes tactile measurement.

8. The method according to claim 1, wherein the order analysis includes a step-by-step determination of dominant frequencies, which includes, for a specified frequency range:
   determining compensation angle functions, wherein the compensation angle function thereof having the greatest amplitude defines a first dominant frequency of the deviations plotted over the rotational angle;
   filtering out from the deviations plotted over the rotational angle the first dominant frequency; and
   determining compensation angle functions for the filtered deviations plotted over the rotational angle, wherein the compensation angle function thereof having the greatest amplitude defines the second dominant frequency of the deviations plotted over the rotational angle.

9. The method according to claim 1, wherein one or more of:
   the at least one measuring path includes a plurality of measuring paths one or more of in a profile direction or in a flank direction;
   in step B), said measuring a deviation includes one or more of an indexing measurement or a partial profile measurement;
   alternatively or additionally to step B), the step of determining a geometrically captured order spectrum includes analyzing measurement data from measuring a deviation of tooth flank geometry of the at least one further tooth using indexing measurement; or
   alternatively or additionally to step A), the step of determining a geometrically captured order spectrum includes analyzing measurement data from measuring a deviation of tooth flank geometry of the at least two teeth using one or more of profile or flank line measurement.

10. The method according to claim 9, wherein the plurality of measurement paths define a measurement grid.

11. The method according to claim 1, further comprising:
   performing a noise measurement of the gearwheel on a noise test stand;
   determining an acoustically captured order spectrum of the noise measurement; and comparing the acoustically captured order spectrum to the geometrically captured order spectrum.

* * * * *